US012759635B2

(12) United States Patent
Pan et al.

(10) Patent No.: US 12,759,635 B2
(45) Date of Patent: Oct. 13, 2026

(54) MULTI-PURPOSE VEHICLE CHASSIS

(71) Applicant: Navitas Vehicle Systems Ltd., Waterloo (CA)

(72) Inventors: Gang Pan, Waterloo (CA); Leroy Sawatzky, Waterloo (CA)

(73) Assignee: Navitas Vehicle Systems Ltd., Waterloo (CA)

( * ) Notice: Subject to any disclaimer, the term of this patent is extended or adjusted under 35 U.S.C. 154(b) by 387 days.

(21) Appl. No.: 18/048,073

(22) Filed: Oct. 20, 2022

(65) Prior Publication Data

US 2023/0125296 A1 Apr. 27, 2023

Related U.S. Application Data

(60) Provisional application No. 63/271,974, filed on Oct. 26, 2021.

(51) Int. Cl.
*B62D 21/02* (2006.01)
*B62D 27/00* (2006.01)
*B62D 29/00* (2006.01)

(52) U.S. Cl.
CPC ............ *B62D 21/02* (2013.01); *B62D 27/00* (2013.01); *B62D 29/008* (2013.01)

(58) Field of Classification Search
CPC ...... B62D 21/02; B62D 27/00; B62D 29/008; B62D 21/07; B62D 21/08; B62D 21/03; B62D 49/06
USPC .................................................. 296/204, 205
See application file for complete search history.

(56) References Cited

U.S. PATENT DOCUMENTS 11,866,099 B2 * 1/2024 Schwartz ............... B62D 21/18
2004/0100085 A1 * 5/2004 Fowler ................... B62D 21/02 280/781
2024/0208315 A1 * 6/2024 Grinstead ............ B60K 17/356

* cited by examiner

*Primary Examiner* — Lori Lyjak
(74) *Attorney, Agent, or Firm* — Gowling WLG (Canada) LLP

(57) ABSTRACT

A vehicle chassis that can be used for more than its intended purpose where the vehicle chassis can be used to support a different vehicle body that its intended purpose or can be use to receive attachments that turn allows the vehicle to be used for a second application. The chassis includes a set of fastened cross-beams that provide support to the vehicle chassis allowing the chassis to support more weight.

4 Claims, 13 Drawing Sheets

MULTI-PURPOSE VEHICLE CHASSIS

CROSS-REFERENCE TO OTHER APPLICATIONS

The current disclosure claims priority from U.S. Provisional Application No. 63/271,974 filed Oct. 26, 2021 which is hereby incorporated by reference.

FIELD

The disclosure is generally directed at vehicles and, more specifically, at a multi-purpose vehicle chassis.

BACKGROUND

When building vehicles, such as a golf cart, builders typically start with a chassis atop which a vehicle body for the vehicle sits. The chassis, which is typically a streel frame, provides support and structure to the vehicle body when the vehicle is manufactured. Typically, current chassis are designed and built to be able to handle one specific vehicle body, or designed for one application.

Due to the design of many current chassis, they are unable to manage or take on the load of a vehicle body for which it was not designed. Attempts to place a vehicle body on a chassis for which it was not designed will result in the application of stresses on different areas of the chassis which may lead to damage or wear on the chassis resulting in a breakage of the chassis rendering the chassis unusable or in need of fixing.

Therefore, there is provided a novel chassis for a multi-purpose vehicle.

SUMMARY

The disclosure is directed at a multi-purpose vehicle chassis that allows the chassis to be used for more than its primary application. In one embodiment, the disclosure includes a set of frame bars that are fastened, and not welded, together. By fastening the frame bars, the overall frame is able to handle more weight than if the frame bars are welded together. In another embodiment, the disclosure is designed and able to support the weight of peripheral parts (outside of the primary application) allowing the vehicle to be used in at least one other application.

In one aspect of the disclosure, there is provided a multi-purpose vehicle chassis including a frame body including a front portion, a middle portion and a rear portion; and a set of support frame bars fastened to the frame body; wherein the support frame bars are fastened via a set of fasteners and provide additional support to the vehicle chassis for enabling the vehicle chassis to be used for more than one application.

In another aspect, the chassis further includes an apparatus for receiving a peripheral attachment. In yet another aspect, the peripheral attachment includes at least one of a front mower peripheral attachment, a snow plow peripheral attachment, a snow blower peripheral attachment, a winch attachment or a mower deck. In a further aspect, the set of support frame bars are a set of cross-beams. In yet another aspect, the set of cross-beams are located in the middle portion of the frame. In a further aspect, the set of cross-beams are parallel to a length of the vehicle chassis. In yet a further aspect, the frame body is made of aluminum.

BRIEF DESCRIPTION OF THE DRAWINGS

Embodiments will now be described, by way of example only, with reference to the attached drawings, in which.

DETAILED DESCRIPTION

The disclosure is directed at a chassis for a multi-purpose vehicle. In one embodiment, the chassis of the disclosure includes a metal, such as, but not limited to aluminum, frame that is able to not only support an initial or intended use of the chassis, but is also capable of being able to support other vehicle applications such that the chassis may be seen as a multi-purpose vehicle chassis. As such, in one embodiment, the chassis of the disclosure may be used for an initial application (such as for a golf cart) but is designed to be able to support attachments, such as, but not limited, to a lawn mower or snow blower attachment, such that the chassis can then be used for a at least one other application.

Figure 1A:
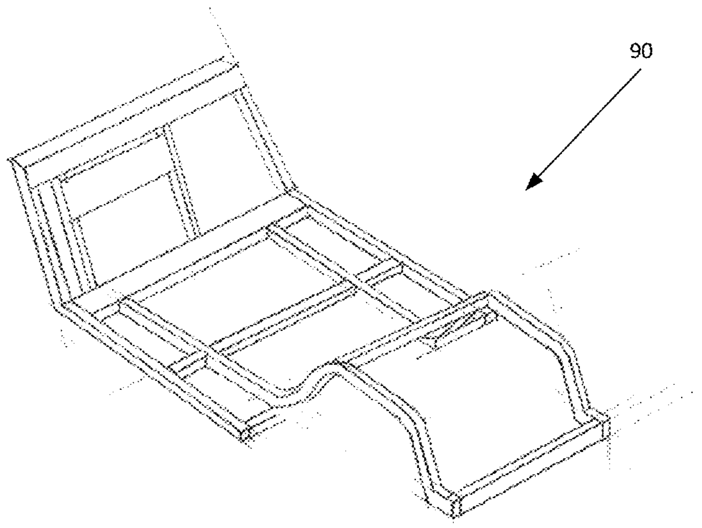
Figure 1a (PRIOR ART)
FIG. 1*a* is a perspective view of a prior art chassis.
Figure 1B:
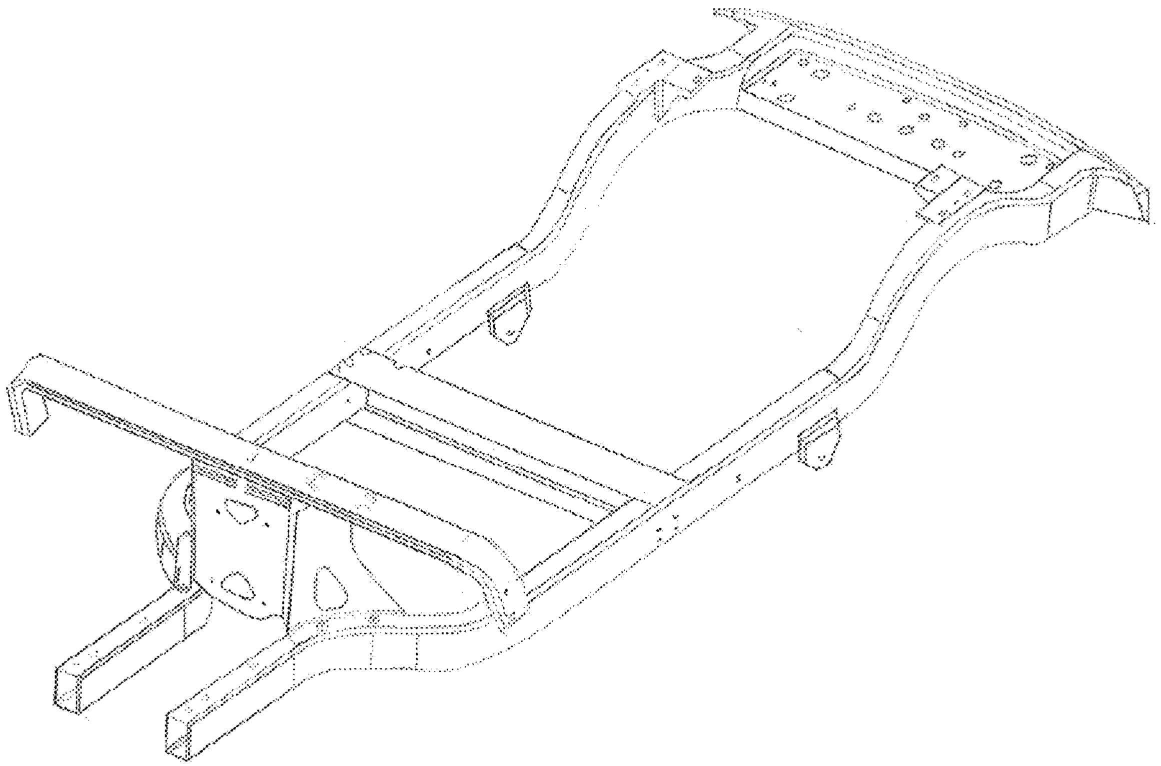
Figure 1b (PRIOR ART)
FIG. 1*b* is a perspective view of another embodiment of a prior art chassis.

Turning to FIGS. 1*a* and 1*b*, perspective views of different prior art chassis are provided. As shown in FIG. 1*a*, the prior art chassis 90 is designed for a golf cart. The prior art chassis 90 may be seen as a frame that includes a set of bars that are welded together or bent into a desired shape. The set of welded bars provide the support for receiving a golf cart body and for carrying this weight when the golf cart is in use. As with most current chassis, the parts of the frame are welded together in order to reduce the cost of manufacture and because the chassis is designed for a single application.

As discussed above, the prior art chassis 90 of FIG. 1*a* is designed for a single application or use (i.e. golf cart) and does not support a second application or use. Since the prior art chassis is geared for a single application, measurements and tolerances for the frame of the chassis 90 are designed or selected based on the single application. As such, there is no need to provide any extra support to handle extra weight since there is only one desired use for the chassis and all the characteristics of the golf cart vehicle body are known. As such, welding is preferred for connecting the set of bars since there are less parts needed to manufacture the frame. FIG. 1*b* is a perspective view of another embodiment of a prior art single-use or single-application chassis.

Figure 2A:
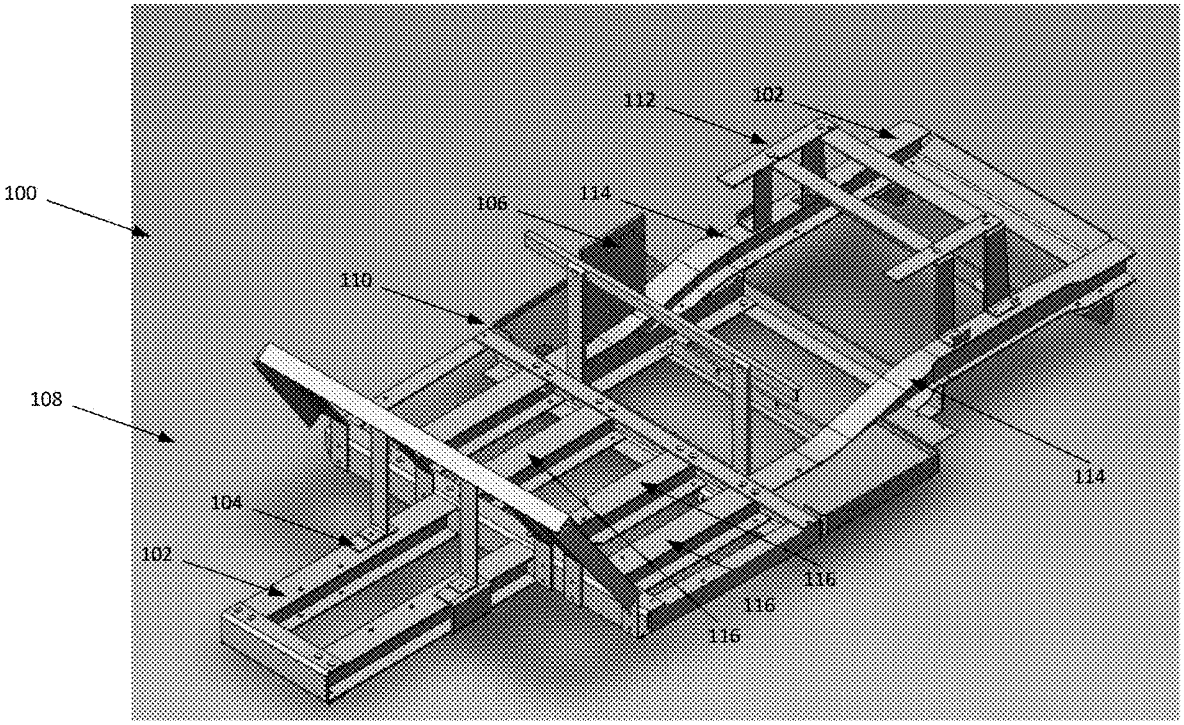
FIG. 2*a* is a perspective view of a chassis in accordance with the disclosure.
Figure 2B:
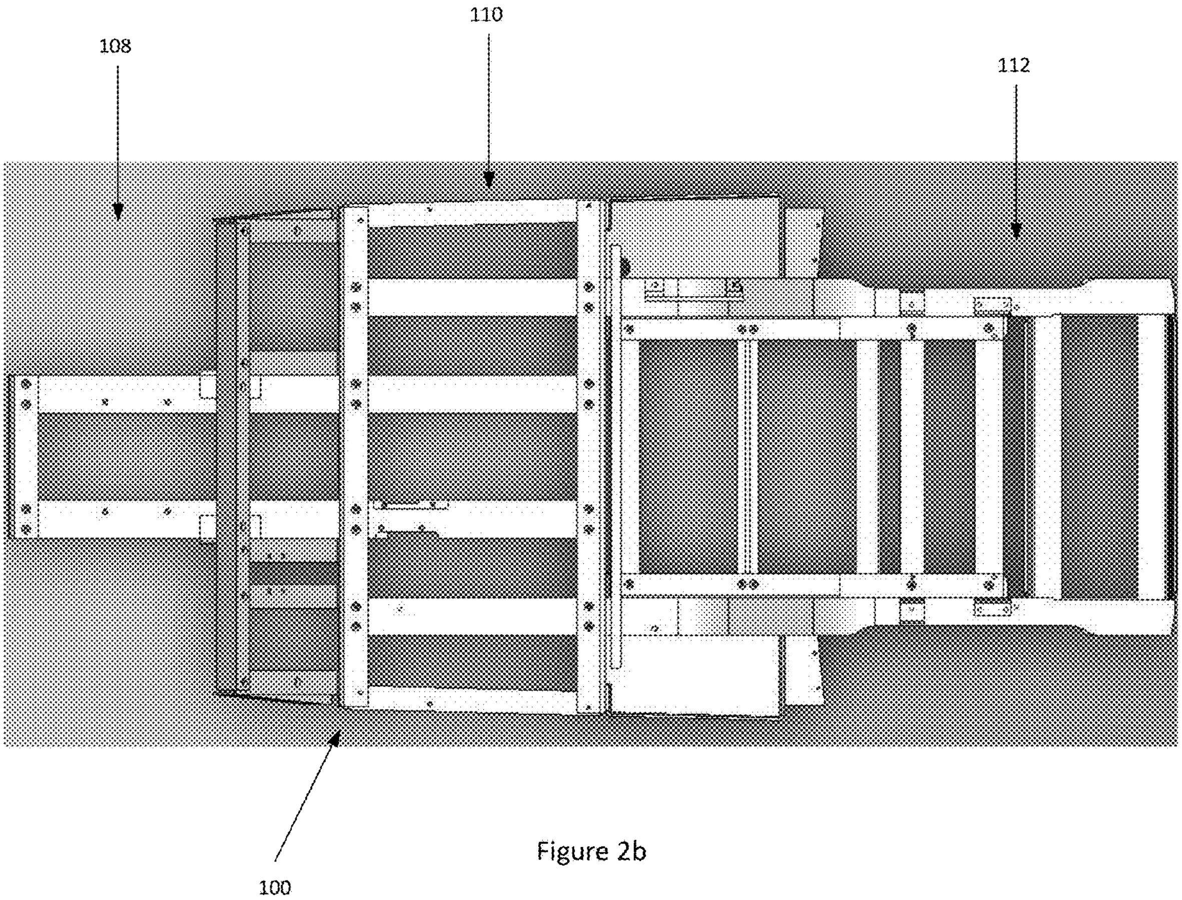
FIG. 2*b* is a top view of the chassis of FIG. 2*a;*

Turning to FIGS. 2*a* and 2*b*, perspective and top views of one embodiment of a multi-purpose vehicle chassis in accordance with the disclosure is shown. The different embodiments of the chassis of the disclosure may be used to support the vehicle bodies of different types of low-speed vehicles such as, but not limited to, golf carts, riding lawnmowers, snow removal machines and other utility vehicle applications while also able to support peripheral attachments that allow the vehicle to be used for at least one other application that is different from its primary design. In other embodiments, the different embodiments of the chassis of the disclosure may be able to support different types of low-speed vehicles For example, many current golf cart chassis cannot be used for other vehicles or application as their design does not allow for extra weight to be supported by the chassis.

In the current embodiment, the chassis 100 includes a set of beams 102, brackets 104 and hardware 106 that, when combined, form the chassis for supporting a multi-purpose vehicle. In one embodiment, the chassis is designed to support different types of vehicle bodies whereby a single chassis can be manufactured for various and different low-speed vehicles. In another embodiment, the chassis is designed to support a vehicle body for a first application and to support peripheral attachments which allow the vehicle to be used for a second application. The chassis also includes apparatus enabling the peripheral attachment to be mounted to attached to the chassis. In some embodiments, the fastening apparatus may enable the peripheral attachment to be permanently mounted and, in other embodiments, the peripheral attachment may be mounted and removed when required.

In the embodiment of FIGS. 2*a* and 2*b*, a middle portion of the chassis 100 is reinforced or buttressed (such as with support bars 119) to provide extra support and/or strength to the frame of the chassis 100 in order to be able to handle different vehicle structures or attachments providing a multi-purpose vehicle chassis.

The chassis 100 includes a front portion 108, a middle portion 110 and an end portion 112. The front portion 108 is typically used to support the suspension and steering to a pair of front wheels (not shown). The front portion 108 can also be used to receive the peripheral attachments, or accessories, such as, but not limited to, a front mower, a snow plow, a snow blower, a winch and the like. The middle portion 110 supports a set of seats and may also support peripheral attachments that are mounted under or to a bottom side of the chassis 100. Examples of peripheral attachments that may be mounted to a bottom of the chassis include, but are not limited to, a mid deck lawn mower. The end portion 112 typically supports a trunk portion of the vehicle body and may also support an axle that is connected to a motor. The end portion 112 may also support a set of rear wheels (not shown). The end portion 112 can also be used to support a burden carrier, for example, a dump box.

In one embodiment, the chassis 100 includes a set of frame rails 114 that define an outer perimeter of the chassis 100 with a set of fastened cross-beams, such as bars 116, that provide additional support for the chassis 100 unlike some current single-application vehicle chassis. The inclusion of these cross-beams 116, in comparison with current chassis, provides an advantage over current chassis as the chassis of the disclosure is able to take more weight and to support the mounting of peripheral attachments. Furthermore, as the cross-beams 116 are all fastened (such as with screws, nails, and other similar hardware) or attached (and not welded), the strength and/or rigidity of the chassis 100 is improved in comparison with current chassis that included welded parts.

In the current embodiment, the middle section 110 includes a set of four (4) fastened support bars 116 that are attached to perpendicular frame bars 114. In one embodiment, a set of fasteners 115 are used to connect the support bars 116 to the frame body. The frame body may include holes for receiving these fasteners. Alternatively, the fasteners may be friction fit fasteners. By fastening the support bars 116 to the frame, further support is provided to the chassis 100 which is an improvement over the welded connections of current chassis. In other embodiments, there may be a different number of support bars, however, they will also be fastened to the respective frame bars and not welded. The added support provides unforeseen advantages over current chassis.

In some embodiments, the disclosure is directed at a chassis that is able to support a golf cart frame or golf cart body and may also be transformed into another type of vehicle with the addition of an attachment, such as, but not limited to, a snow plow attachment or a lawn mower attachment. An example is schematically shown in FIG. 3.

Figure 3:
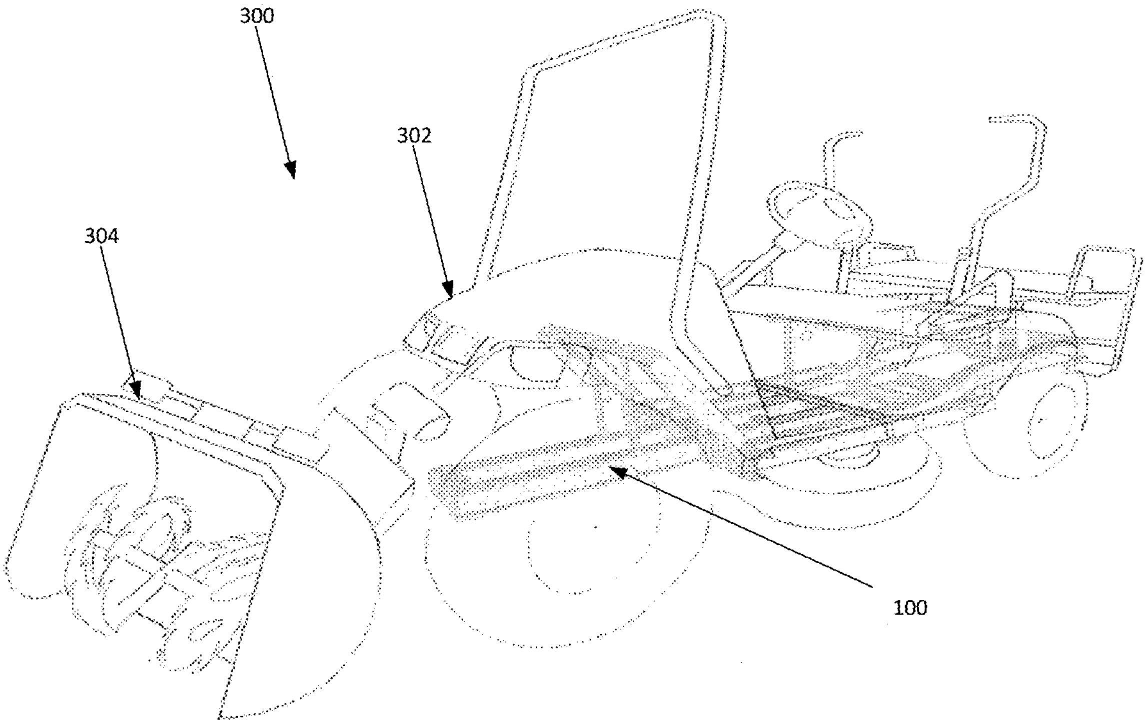
FIG. 3 is a schematic diagram of the multi-use chassis of the disclosure having multiple applications.

As shown in FIG. 3, the vehicle 300 includes a multi-use chassis 100 (such as the one shown in FIGS. 2*a* and 2*b*) that is able to accommodate a golf cart body 302 along with a snowplow attachment 304. Current chassis are unable to accommodate the peripheral attachments as they are not designed to accept or support more weight that its intended or single application. In other embodiments, the chassis 300 may be designed to support different types of vehicle bodies whereby the decision may be based on a manufacturer. For example, with an embodiment of the chassis of the disclosure, a golf cart body or a lawnmower body may be placed atop the chassis depending on decisions being made by the manufacturer. In some embodiments, the peripheral attachment may then be attached to the chassis, however, the versatility of the chassis of the disclosure to support either a golf cart body or a lawnmower body is also an improvement over current chassis. The design of the chassis of the disclosure enables the chassis to be used for different types of vehicles.

In another embodiment, the chassis 300 may include further support beams that provide benefits that are not available or present in current vehicle chassis. The chassis 300 may include further fastened support bars 119 within the front 108, middle 110 or rear 112 portions or sections of the vehicle chassis 300 and may therefore, be able to handle any additional weight capacity so that the chassis can be used for a second application that is different from an initial application.

Figure 4A:
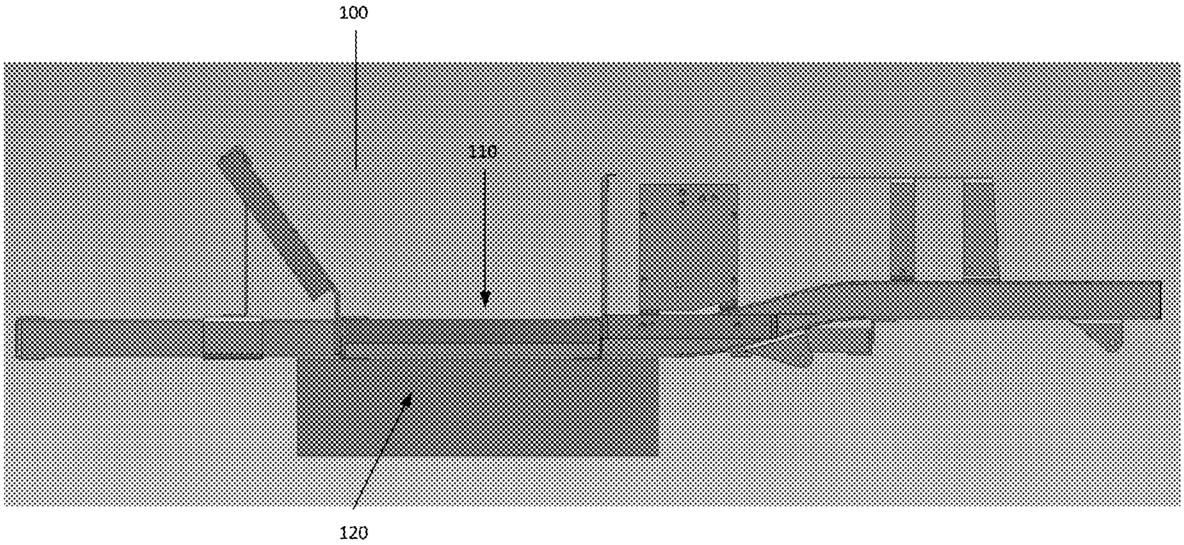
FIG. 4*a* is a side view of a chassis of FIG. 2*a* with a mower deck.
Figure 4B:
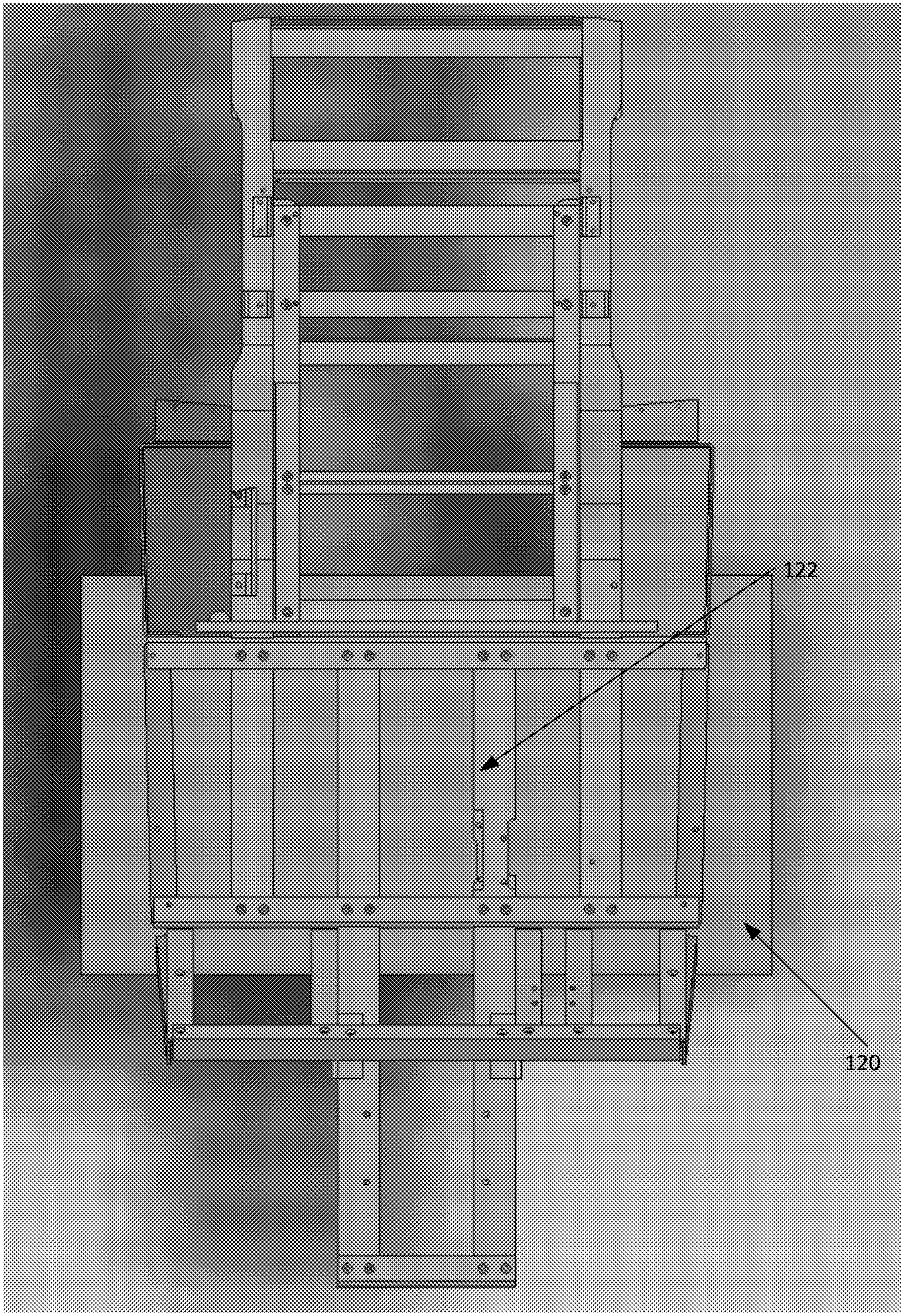
FIG. 4*b* is a top view of the chassis of FIG. 4*a;*
Figure 4C:
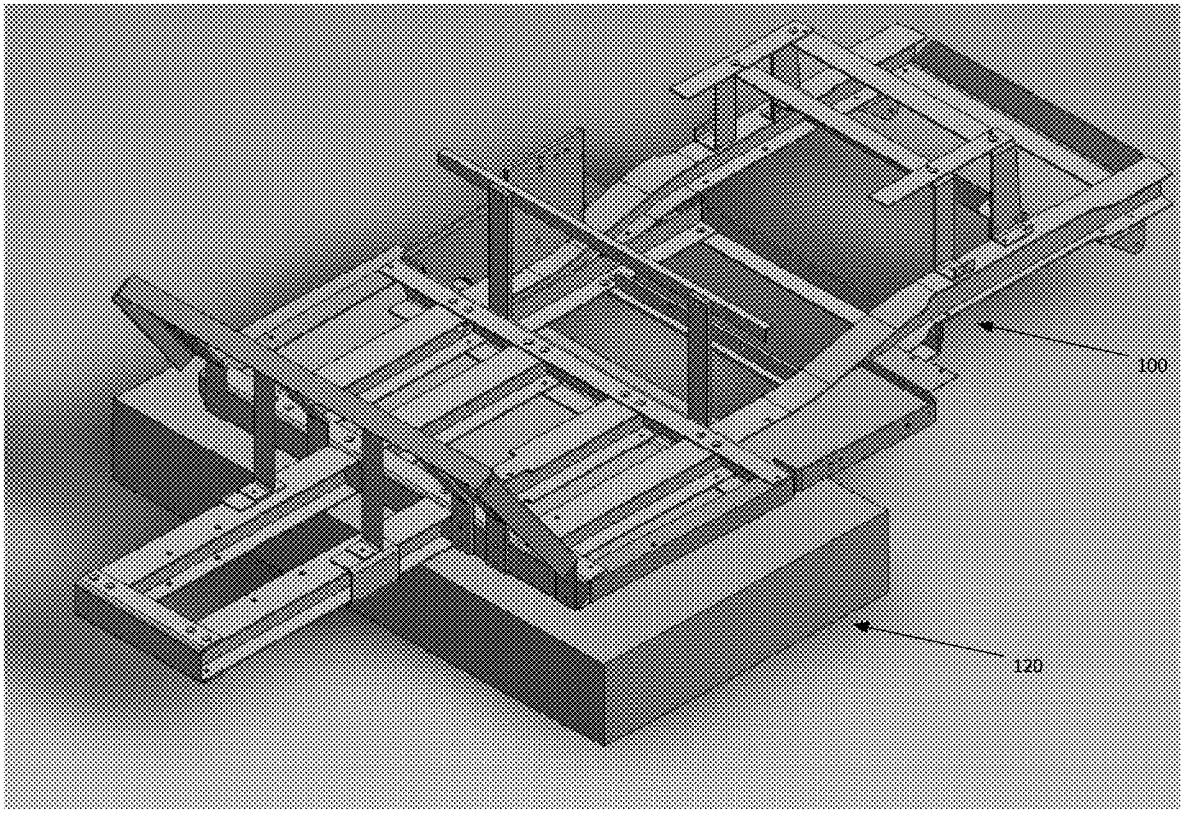
FIG. 4*c* is a perspective view of the chassis of FIG. 4*a;*

As shown in FIGS. 4*a* to 4*c*, different views of the chassis with a mower deck mounted to the chassis is shown. As can be seen, a mower deck 120 is mounted to the middle portion 110 of the chassis 100 which has been designed to accommodate the mower deck 120 (due to the presence of the extra fastened bars). Unlike current golf cart chassis that cannot be converted for use in another application, such as, but not limited to, a lawn mower, the chassis of the disclosure can accommodate the mower deck 120 which may be used to mount auxiliary and/or further accessories or attachments such as, but not limited to, a lawn mower attachment. Alternatively, a snow plow attachment may be mounted to the chassis such that the chassis can be used as a snow plow.

As shown in FIG. 4*b*, the mower deck 120 is mounted to the novel fastened cross-beams 122 (which may also be the support bars 116) that provide support to the chassis enabling the chassis to support the mower deck 120. By having the support bars fastened to the frame body, the frame is able to support more weight than some current chassis and to enable the chassis to be used for a different application that its initial intended application.

One improvement of the chassis of the disclosure is that the chassis does not require any welding of structural beams which improves the overall strength of the chassis of the disclosure. Also, unlike current chassis, the set of support beams of the disclosure allows the chassis to be used as a multi-purpose vehicle chassis.

Figure 5A:
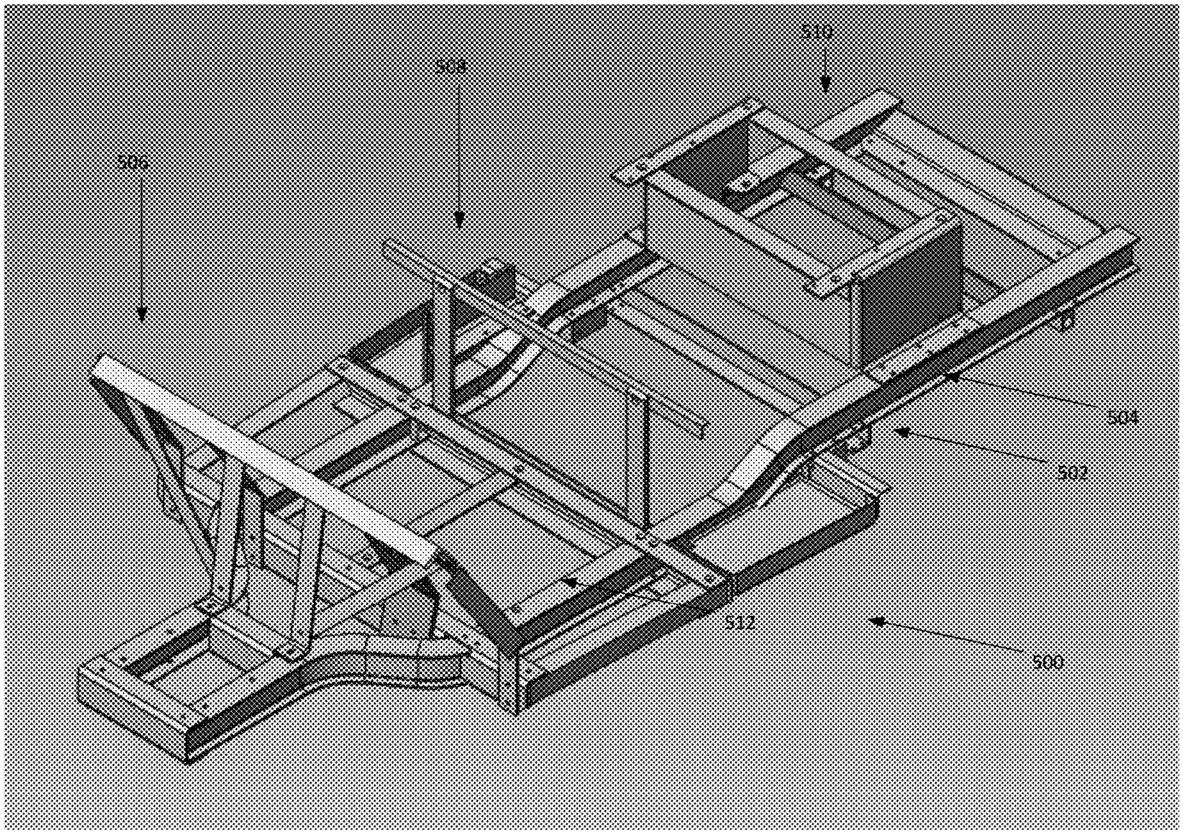
FIG. 5*a* is a perspective view of another embodiment of a chassis in accordance with the disclosure.
Figure 5B:
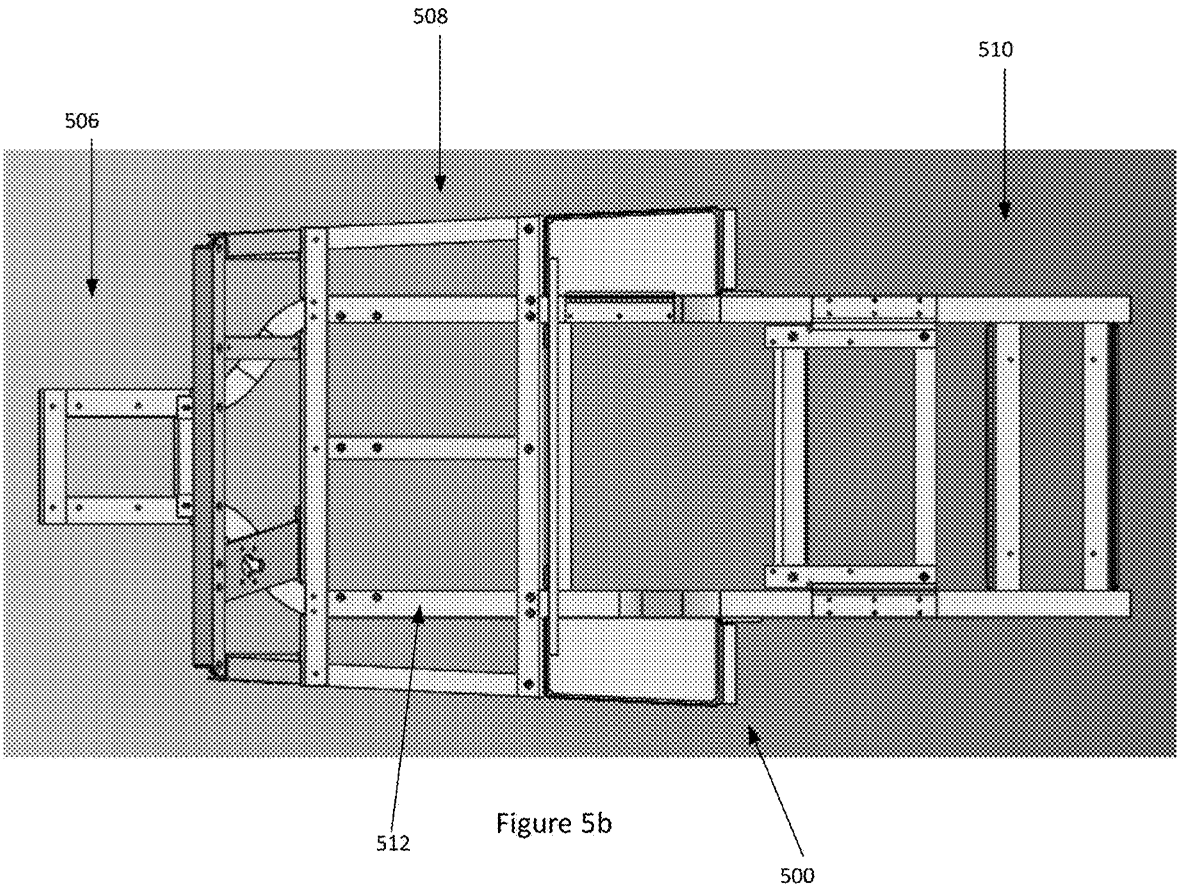
FIG. 5*b* is a top view of the chassis of FIG. 5*a;*

Turning to FIGS. 5*a* and 5*b*, perspective and top views of another embodiment of a chassis in accordance with the disclosure is shown. The chassis 500 of FIGS. 5 and 5*b* includes a frame 502 that includes a set of frame bars 504 that define an outer shape of the frame 502. Similar to the embodiment of FIGS. 2*a* and 2*b*, the chassis 500 includes a front portion 506, a middle portion 508 and a rear portion 510. A set of support bars 512 are fastened (via a set of fasteners 513) to some of the frame bars 504 to provide additional support to the chassis when it receives a vehicle body and peripheral attachments. In the current embodiment, there are three (3) support bars 512. In some embodiments, the frame bars 504 include openings to receive the set of fasteners.

Figure 5C:
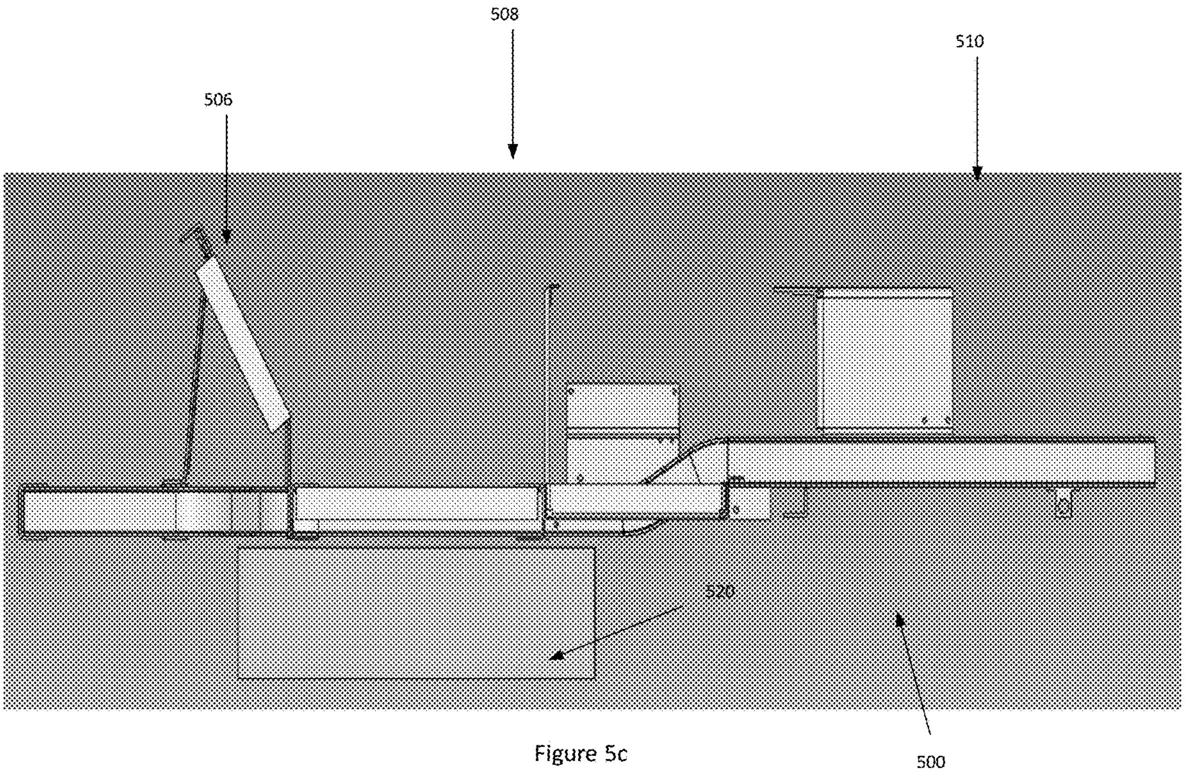
FIG. 5*c* is a side view of a chassis of FIG. 5*a* with a mower deck.
Figure 5D:
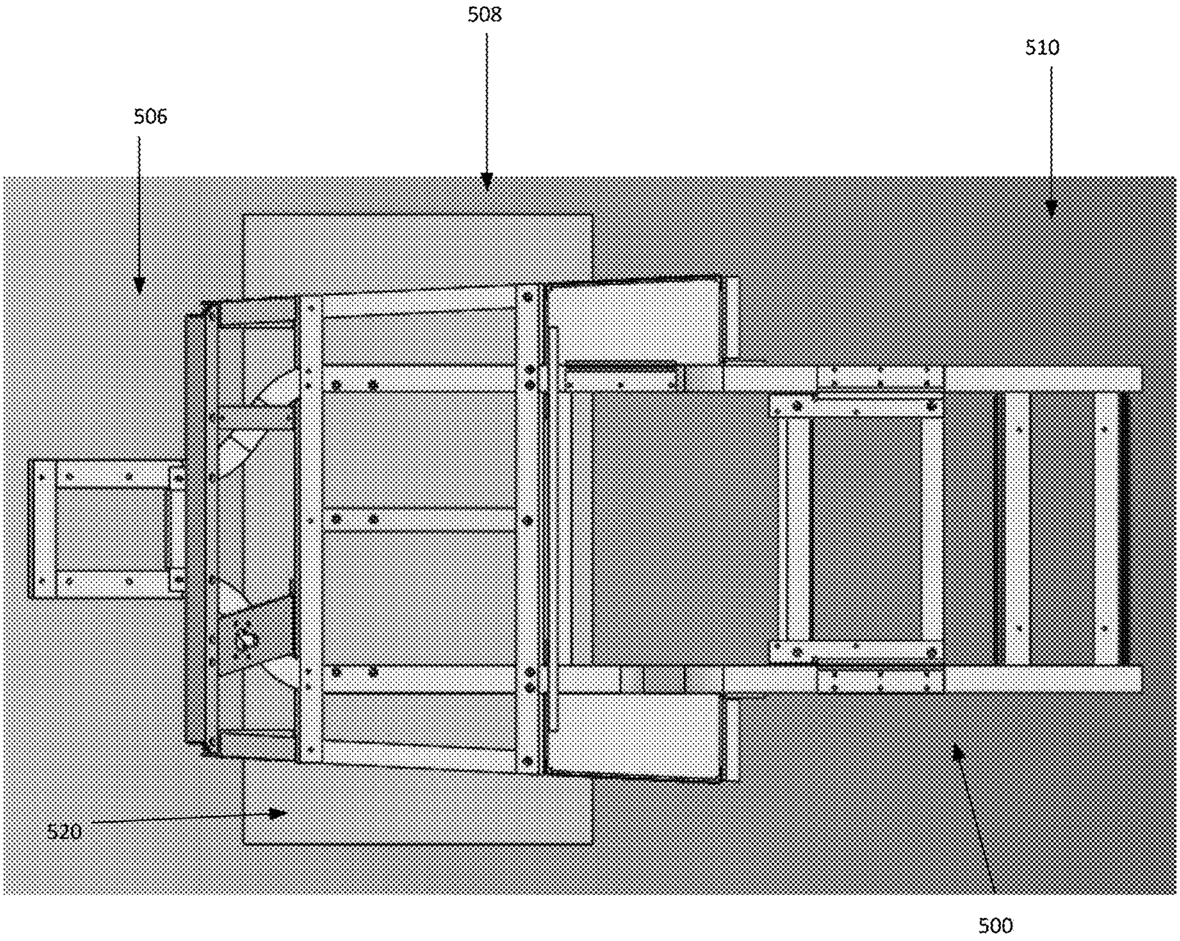
FIG. 5*d* is a top view of FIG. 5*a*.
Figure 5E:
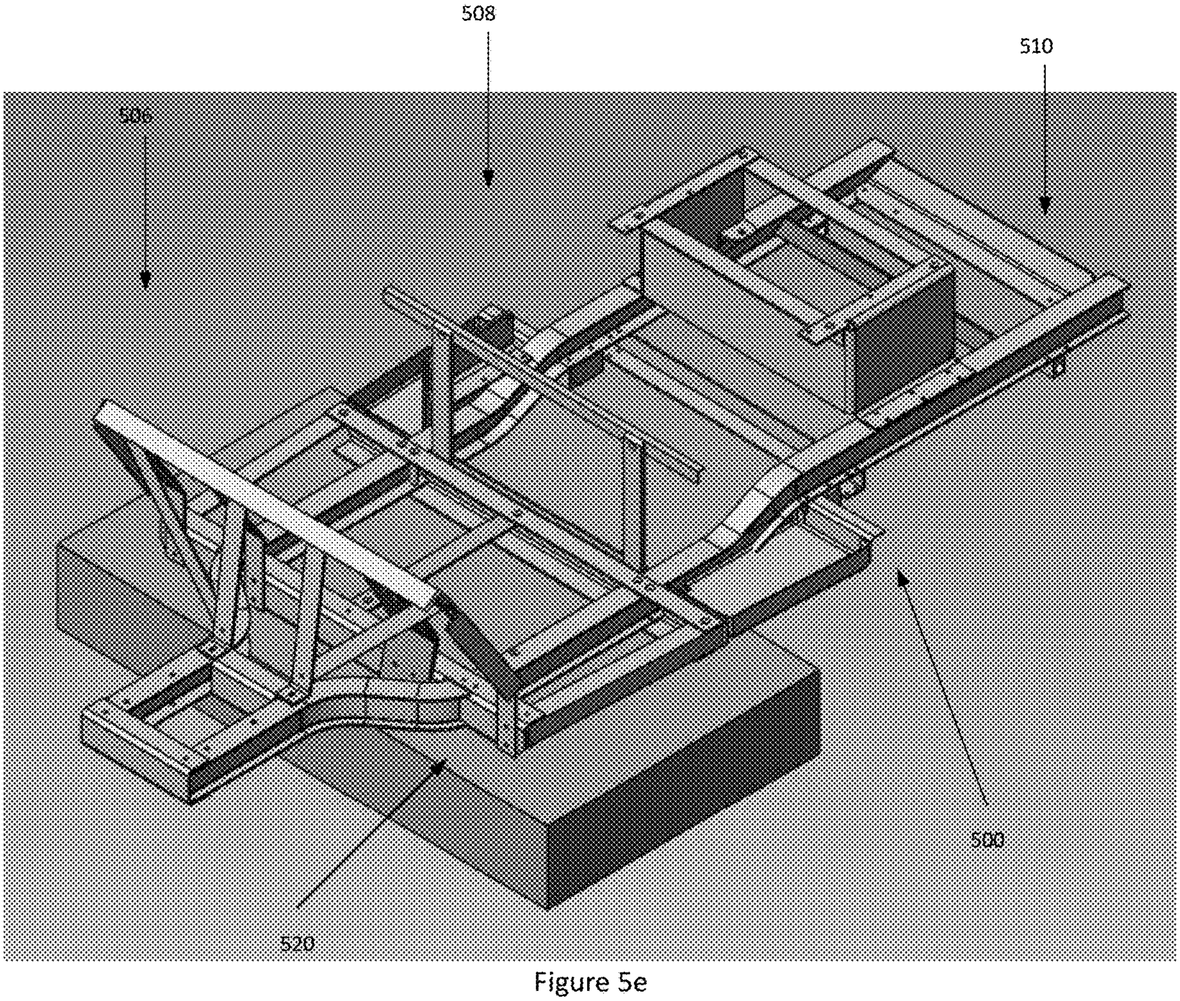
FIG. 5*e* is a perspective view of FIG. 5*a.*

FIGS. 5*c* to 5*e* show the chassis of FIGS. 5*a* and 5*b* with a mower deck 520 mounted to a bottom of the chassis 500. The mower deck 520 may receive other peripheral attachments such that the chassis can be used for more than a single application. Although not shown, peripheral attachments may also be mounted to the front portion 506 of the chassis 500

Some advantages of the chassis of the disclosure is that the chassis includes an engineered assembly using metal beams, brackets & hardware to create a super-strong multi-purpose vehicle chassis. The vehicle chassis of the disclosure is stronger than current welded-frame designs as many failures of current golf-cart vehicle chassis tend to occur at welded points. The fastening of the support bars provide an advantage in that the chassis of the disclosure is not as susceptible to typical design failures due to broken welds and weak bent beam areas. The design and manufacture of the chassis is a controlled engineered assembly process that ensures efficient through assembly process.

Another advantage is that the chassis of the disclosure is designed to accommodate readily available suspension/steering/body components while providing a stronger frame to support one or more peripheral attachments via bump stops on rear frame that reduce the likelihood or prevent springs from being overstressed due to weight of the peripheral attachments. Furthermore, the chassis is designed to be assembled without welding and has multiple support cross-beams to increase the strength and rigidity of the frame. Another advantage is that the chassis is that it is designed with minimal, or a low number of bends within the frame bars which are not in torsional direction to prevent or reduce metal fatigue over time. Also, the design of the chassis of the disclosure allows for increasing/decreasing the length by changing lengths of frame rails.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding The above-described embodiments are intended to be examples only. Alterations, modifications and variations can be effected to the particular embodiments by those of skill in the art without departing from the scope, which is defined solely by the claim appended hereto.

What is claimed is:

1. A multi-purpose vehicle chassis comprising:

a frame body including a front portion, a middle portion and a rear portion; and a set of support frame bars fastened to the frame body;

wherein the support frame bars are fastened via a set of fasteners and provide additional support to the vehicle chassis for enabling the vehicle chassis to be used for more than one application;

wherein the set of support frame bars are a set of cross-beams located in the middle portion of the frame body and each of the set of cross-beams is parallel to a length of the vehicle chassis.

2. The multi-purpose vehicle chassis of claim 1 further comprising:

an apparatus for receiving a peripheral attachment.

3. The multi-purpose vehicle chassis of claim 2 wherein the peripheral attachment comprises at least one of a front mower peripheral attachment, a snow plow peripheral attachment, a snow blower peripheral attachment, a winch attachment or a mower deck.

4. The multi-purpose vehicle chassis of claim 1 wherein the frame body is made of aluminum.

* * * * *